United States Patent [19]

Kemper

[11] 3,858,732

[45] Jan. 7, 1975

[54] MAGAZINE FOR STACKABLE TRAYS

[76] Inventor: Kate Kemper, Wybuelstrasse 6, 8702 Zurich, Zollikon, Switzerland

[22] Filed: Mar. 7, 1972

[21] Appl. No.: 232,574

[30] Foreign Application Priority Data
Mar. 9, 1971 Germany............................ 2111223
May 10, 1971 Germany............................ 2122968

[52] U.S. Cl. ............ 214/8.5 K, 214/6 BA, 221/251
[51] Int. Cl. .......................................... B65g 59/06
[58] Field of Search.................... 221/236, 251, 298; 214/6 BA, 6 FA, 8.5 K

[56] References Cited
UNITED STATES PATENTS

| | | | |
|---|---|---|---|
| 2,028,410 | 1/1936 | Rapisarda | 214/8.5 K X |
| 2,251,197 | 7/1941 | Nestmann | 214/8.5 K |
| 2,897,949 | 8/1959 | Huisking | 214/6 BA X |
| 3,043,476 | 7/1962 | Zwarycz | 214/8.5 F X |
| 3,283,955 | 11/1966 | Crabtree | 221/298 X |
| 3,401,808 | 9/1968 | Kemp | 214/6 BA |

FOREIGN PATENTS OR APPLICATIONS 212,562    4/1967    Sweden............................ 214/8.5 K

*Primary Examiner*—Robert J. Spar
*Assistant Examiner*—George F. Abraham
*Attorney, Agent, or Firm*—Spencer & Kaye

[57] ABSTRACT

A magazine for stackable trays comprises vertical storage means for the trays, feeding means for feeding the trays substantially horizontally to or from the storage means and raising and/or lowering means for controlling, in dependence of the feeding means, movement of the trays in the storage means.

11 Claims, 7 Drawing Figures

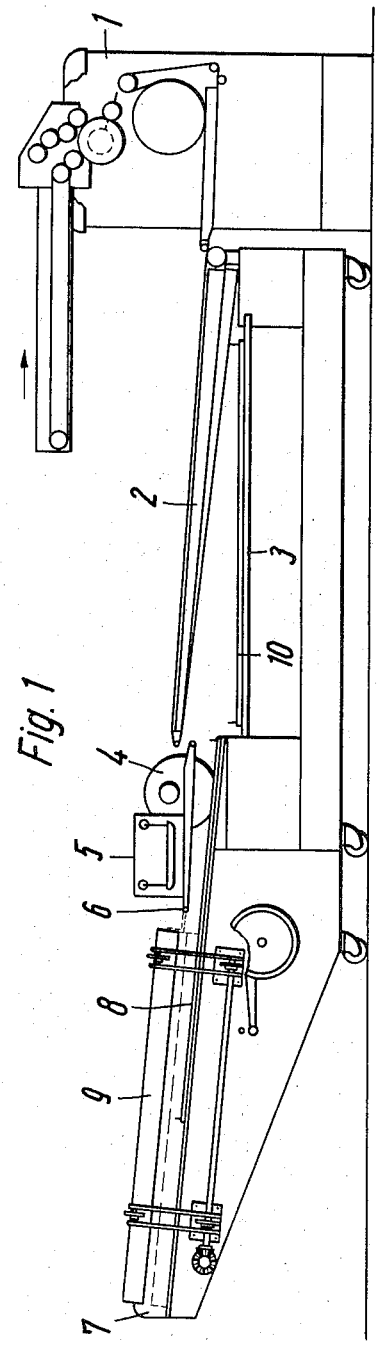
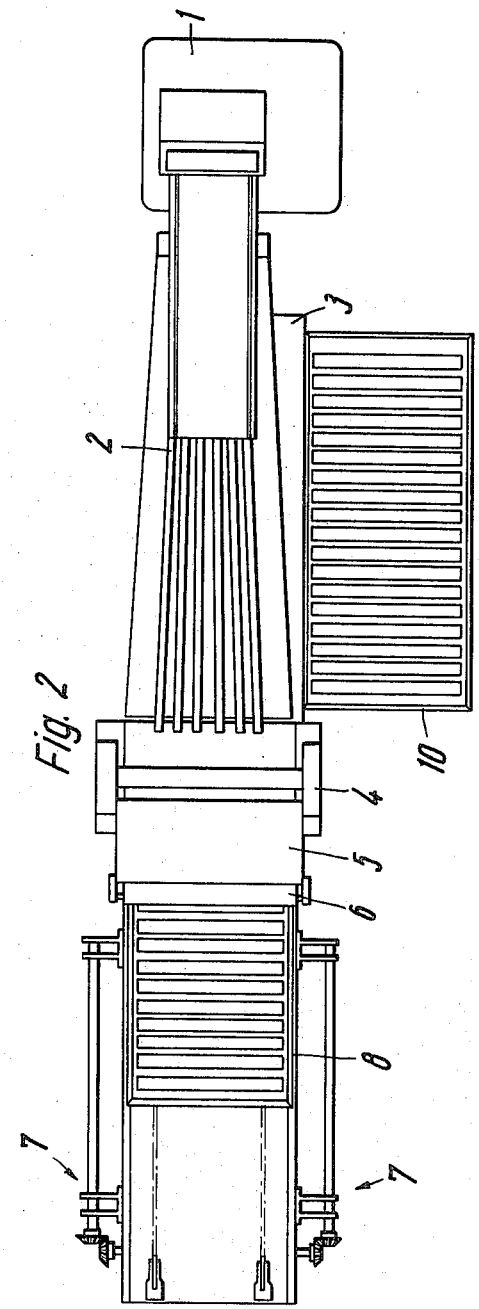

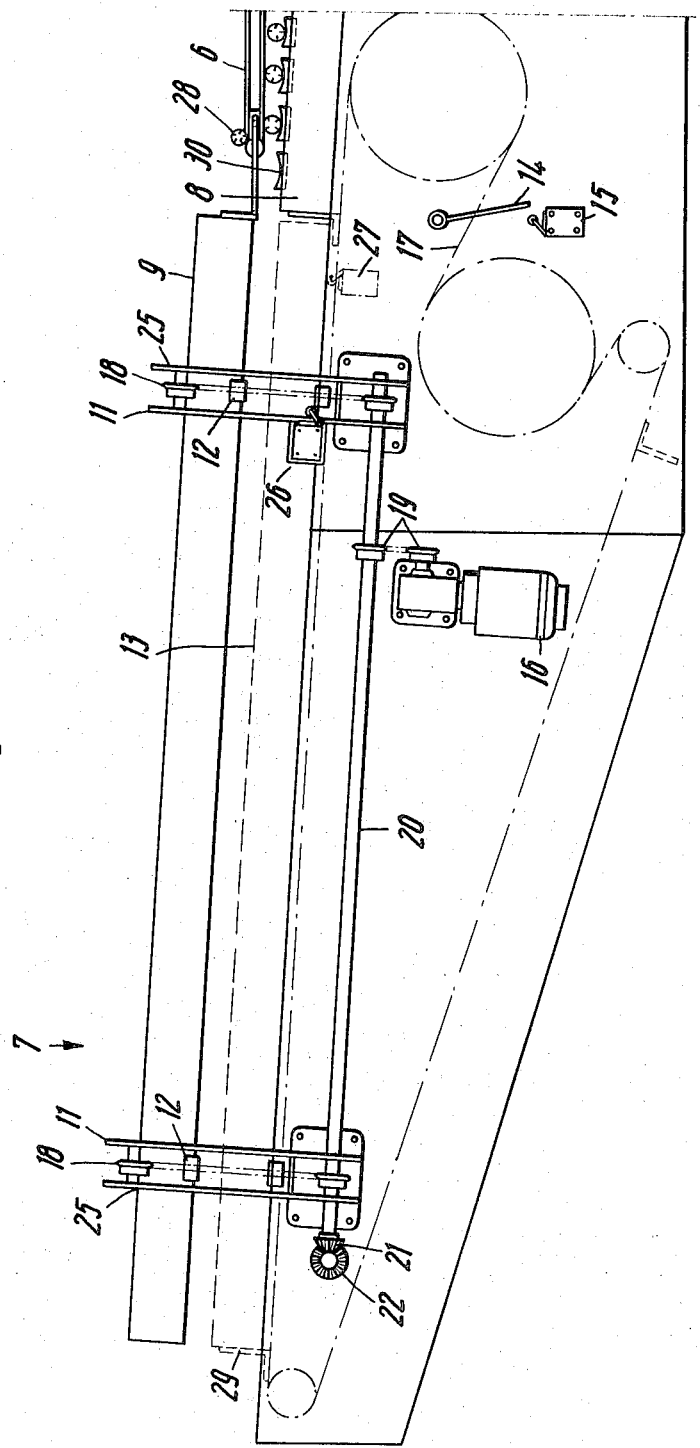

MAGAZINE FOR STACKABLE TRAYS

BACKGROUND OF THE INVENTION

The invention relates to a magazine for stackable trays for goods in proving, especially for a combined dough divider and hander-up with transport and filling devices.

A known installation of this kind consists of a dough divider and hander-up to which a dough mass is fed and which delivers handed-up dough pieces to a spreader conveyor belt which is followed by a rolling-out station with a folding-in device. Such combined dough dividers and handers-up serve especially for the production of small bread articles such as rolls or French rolls. After the dough pieces have travelled through the rolling station and the folding-in device they are placed with their seam downwards on proving trays which can for example comprise rockers.

These proving trays are fed then to a proving chamber and then to a baking oven in which the small bread articles are laid with the seam upwards on a hearth surface.

In the construction and design of such installations endeavours are made to find solutions which permit one single person to operate such devices. Here it must be taken into account that the proving trays utilized correspond approximately to the length of the baking hearth which is thus predetermined and as a rule amounts to about 160 cm. with a width of 60 cm.

In the devices of this kind as known hitherto the disadvantage exists that the working rhythm of the machine is dependent upon the working rhythm of the operator. If for example the operator does not place a proving tray available to the charging chute at the right time, the operation of the device is delayed or interrupted. The same problem exists in the removal of the filled proving trays from the device. If in fact the operator is not on the spot at the right time to take a filled proving tray out of the device, there is a build-up of following filled tilting trays so that for this reason the machine again shuts off or has to be switched off.

SUMMARY OF THE INVENTION

It is an object of the invention to provide a magazine for stackable proving trays for a combined dough divider and hander-up with a transport device and a filling device, which works independently of the working rhythm of an operator and makes maximum use of the individual component devices.

It is a further object of the invention to provide a magazine for proving trays formed in such a way that continuous charging of the proving trays is rendered possible even in the transition from one proving to the other, with uniform feed motion.

It is a still further object of the invention to provide a raising and lowering device for a magazine which works fully automatically, is composed of simple conventional elements and therefore can be produced at a favorable price and works reliably in every position.

According to the invention, there is provided a magazine for stackable trays comprising vertical storage means for said trays, feeding means for feeding trays substantially horizontally to or from said vertical storage means and raising and/or lowering means operable step by step by said feeding means for controlling movement of said tray in said vertical storage means.

BRIEF DESCRIPTION OF THE DRAWINGS

The invention will now be described in greater detail, by way of example, with reference to the drawings, in which:

FIG. 1 shows a cross-section through the entire installation of the combined dough divider and hander-up with a transport and filling device and a magazine according to the invention;

FIG. 2 shows a plan view of the installation according to FIG. 1;

FIG. 3 shows an enlarged representation of the magazine for the proving trays with a part of the filling station;

In the individual Figures the same or similar elements are provided with the same reference numerals.

DESCRIPTION OF THE PREFERRED EMBODIMENTS

Figure 4:
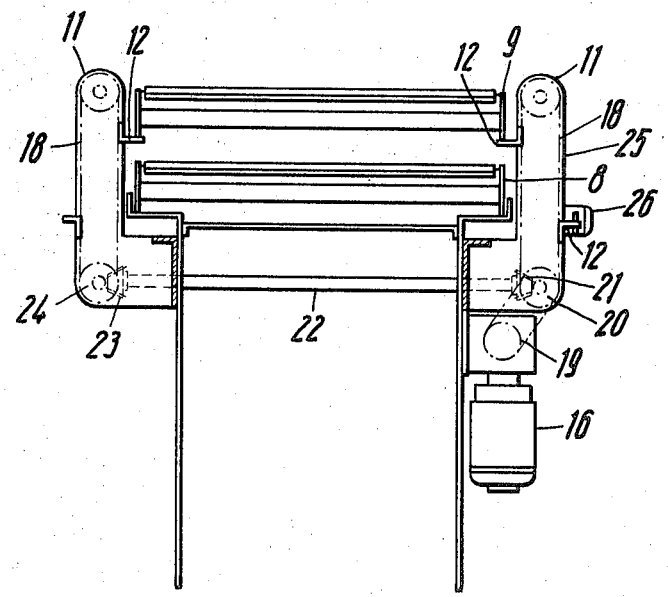
FIG. 4 shows a cross-section through the magazine according to FIG. 3.

Basically the invention proposes that in a magazine for proving trays, especially for a combined dough divider and hander-up with transport and filling devices, a lowering or raising device holding the proving trays is operable step-by-step by a device for the approximately horizontal feed motion of the proving trays.

The feed apparatus may here advantageously comprise a signal emitter which controls the lowering or raising device in dependence upon the position of a proving tray passing the filling device. The signal emitter here has a cam disc which is operatively connected with a stepping gearing of the feed device and the cam of which is capable of acting upon an on switch for a braking geared motor which actuates a lowering or raising device.

The lowering or raising device comprises endless chains connected operatively with the braking geared motor and provided with circulating retaining devices for the proving trays. Four endless chains circulating in a frame are advantageously provided which are arranged in relation to one another in such a way that the proving trays are arranged in a stable position in the magazine. For the switching off of the braking geared motor an off switch is allocated to one endless chain, which switch is operable by the circulating retaining devices. For the avoidance of switching errors according to the invention a safety switch operable by a proving tray is provided which switches off the braking geared motor. According to the invention the lowering or raising time of a proving tray from its waiting position into the feed position or vice versa corresponds to the time which a dough piece requires to travel from the feed belt of the filling device on to the proving tray, so that the automatic filling of the proving trays takes place continuously with constant feed motion.

A further solution of the problems set above consists in that in a magazine for similar and stackable elements the lowermost element in the magazine in each case is feedable by means of an automatically controllable raising and lowering device to a transport device which takes over the removal. According to this form of embodiment of the invention the raising and lowering device is automatically controllable by the transport device which takes place over the removal of the elements from the magazine. In this case again the transport device comprises a signal emitter which controls the raising and lowering device in dependence upon the position of a charging or proving tray passing the filling device. The lowermost in each case of the elements stacked one above the other in the magazine rests according to the invention on several support surfaces which are movable each along a movement curve. The movement curve here advantageously lies in a vertical plane. According to the invention the movement curve is made in parallelogram form and a vertical side of the parallelogram facing the element possesses an upwardly directed extension which is of such size that an unhindered removal of the element resting on the transport device is ensured. According to the invention the movement curve is travelled by the support surface with the aid of positively guided mechanical means. The movement of the support surface in the vertically extending part of the movement curve is effected by a bolt secured against rotation and slidable in a guide, which bolt is movable by a motor driven eccentric disc. A roller rotatably mounted in the lower part of the bolt is arranged for rolling on the outer periphery of the accentric disc, according to the invention. The movement of the support surface in the vertically extending part of the movement curve takes place according to the invention alternatively by a bolt secured against rotation and slidable in a guide, which bolt is movable by a motor driven disc, the disc having an eccentrically extending milled-in portion on one side face, in which a guide arm of the bolt engages. In a further development of the invention the support surface is integrally connected with a cylinder which is horizontally slidably arranged in a sleeve and secured against rotation and the sleeve in turn is secured to the upper part of the bolt. On the axially opposite end of the cylinder a roller is rotatably mounted which in the upper position of the cylinder strikes against an upper ramp surface arranged on the inside of the housing of the raising and lowering device and thus brings the support surface into a holding position and holds it fast, and which runs up on to a lower ramp surface before reaching its lower end position, which ramp surface is situated in the same vertical plane as the upper ramp surface and thus brings the support surface out of the support position into the run-up position.

In this form of embodiment of the invention four raising and lowering devices are arranged in the magazine in such a way in relation to one another that the charging trays are arranged in a stable position in the magazine. The individual raising and lowering device are actuated in synchronism in operation.

Referring now to the drawings, in FIG. 1, 1 designates a dough divider and hander-up which is followed by a spreader conveyor belt 2 with a vibrating table 3 situated therebeneath. 4 designates a rolling-out station which is followed directly by a folding-in device 5 which serves to fold in a flat-rolled dough pieces anew. Beneath the folding-in device 5 there is a conveyor belt 6 of the filling station which feeds the finished roughed dough pieces to a proving tray 8 coming from the magazine 7. A further proving tray 9 is situated above the proving tray 8 already partially in position, Between the dough divider and hander-up 1 and the rolling-out station 4 and the folding-in station 5 the filled proving tray 10 is pushed out laterally (see FIG. 2 in this connection) and can there be fed to a further reception magazine (not illustrated).

In FIG. 3 the magazine 7 is shown in enlarged representation.

In the lowering device 11 there is the proving tray 9 which is held by the holding device 12. FIG. 3 shows a condition in which the proving tray 9 is being driven into the position 13 shown in broken lines. In contrast thereto FIG. 1 shows a condition in which the proving tray 9 is held in the upper position while the proving tray 8 is passing the conveyor belt 6 and thus the filling station. 14 designates a signal emitter which acts upon an on switch 15 for the braking geared motor 16. The signal emitter 14, which is here represented as a lever, but can also be formed as a cam disc, is operatively connected with a stepping gearing 17, of which a chain is illustrated here. Each lowering device 11 has an endless chain 18 operatively connected with the braking geared motor 16 and provided in each case with holding devices 12 for the proving trays. The transmission from the braking geared motor 16 to the endless chains 18 takes place through a chain gearing 19, a shaft 20, a bevel wheel 21 connected with a shaft 22, a further bevel wheel 23 to the shaft 24 (FIG. 4). Thus the object is achieved that all endless chains are driven in synchronism. The endless chains 18 are situated in each case in a housing 25 which has an opening on the side facing the proving tray 8 or 9 in such a way that the holding device 12 can emerge from the housing and hold a proving tray. An off switch 26 is assigned to one endless chain in such a way that it can be actuated by the holding devices and switches off the braking geared motor 16. A safety switch 27 is so formed that it is actuated by a proving tray in the lower position so that then the braking geared motor remains switched off.

The function and manner of operation of the magazine according to this example of embodiment of the invention are as follows:

An empty proving tray 9 is introduced by an operator into the magazine 7 so that it is held in a stable position by the holding device 12. As soon as dough pieces 28 drop into the last rocker 30 of a proving tray 8, the on switch 15 is tripped by the signal emitter 14 running in synchronism with the proving tray 8, whereby the braking geared motor 16 starts up immediately and through the shafts 20, 22 and 24 moves the endless chains 18 so that the holding devices 12 with the proving tray 9 situated thereon pass into the lower position 13. When the proving tray 9 has assumed the lower position 13 a holding device 12 operates the off switch 26 whereby the braking geared motor 16 is switched off again. At the same time however for safety reasons the safety switch 27 is operated which leaves the braking geared motor 16 switched off as long as it is operated by a proving tray 9 (in the position 13). This happens until the end part of the proving tray 9 (in the position 13) comes out of contact with the switch 27. After the lower position 13 is reached an engaging member 29 situated on the chain of the stepping gearing 17 and secured therewith grasps the proving tray and conveys it step by step through the filling station beneath the conveyor belt 6 to the rolling-out station 4 and the folding-in device 5.

The basic principles of the magazine of this example of embodiment according to the invention can also be used to form a magazine for the reception of filled proving trays. As may readily be seen it is necessary in this case that the time course should proceed in the reverse sequence. Such a receiving magazine can be arranged for example beside the spreader belt 2 in FIG. 2 approximately in the position of the proving tray 10.

Now the invention renders it possible for a combined dough divider and hander-up with transport and filling devices to work continuously with an operator feeding an empty proving tray 9 to the magazine 7 before the moment when a proving tray liberates the safety switch 27.

Figure 5:
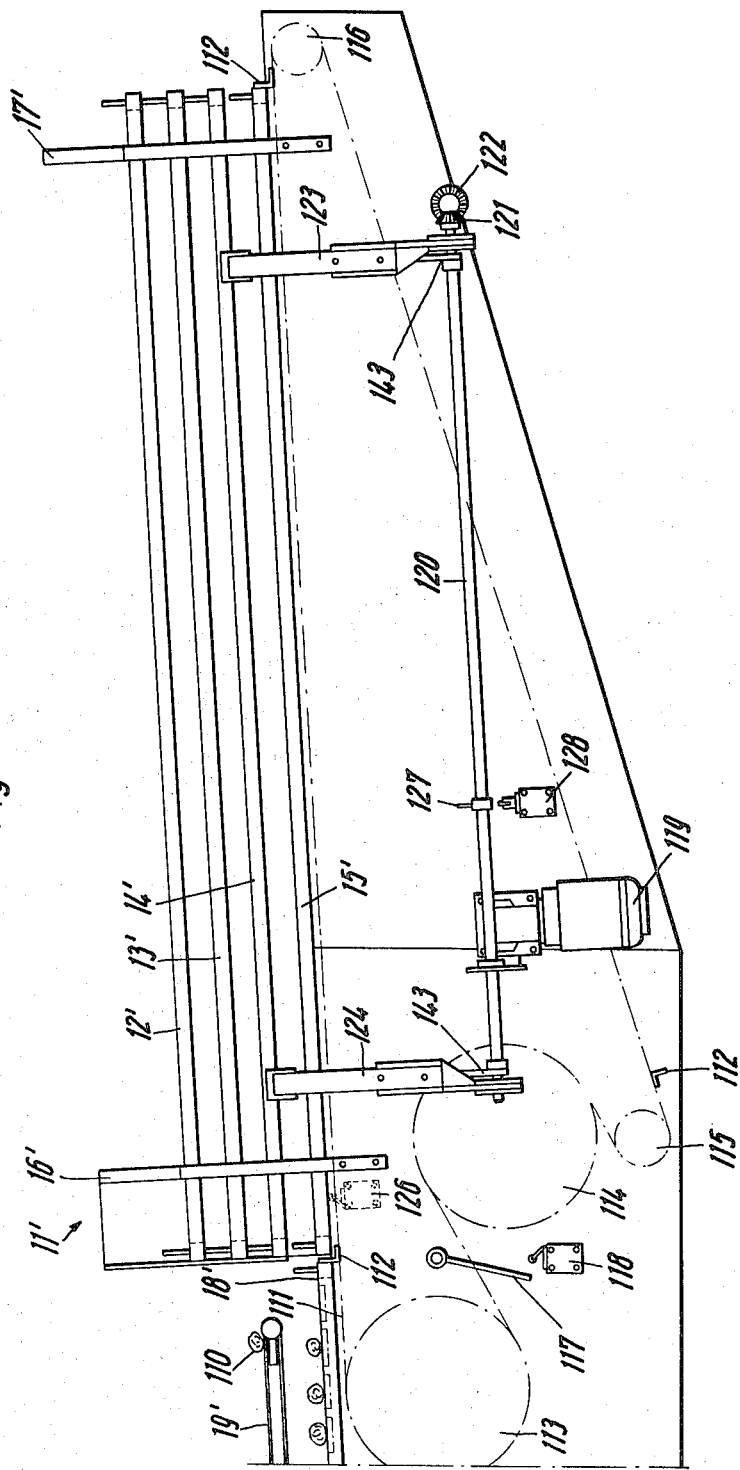
FIG. 5 shows a cross-section through a part of the entire installation of the combined dough divider and hander-up with a transport and filling device and a further example of embodiment according to the invention.

In FIG. 5, 11' designates a further example of embodiment of a magazine for charging or proving trays, in which proving trays 12', 13', 14' and 15' are stacked one above the other and secured against lateral slipping by side holders 16', 16''and 17'. A further proving tray 18' which is only partially illustrated in FIG. 5, is situated beneath a conveyor belt 19' of a filling station. Pieces of dough 110 are fed from the conveyor belt 19' to the proving tray 18' which can be moved to the left in the plane of the drawing by a transport apparatus consisting of an endless chain 111 on which engaging members 112 are secured at specific points corresponding to the length of the proving trays. The endless chain 111 cam be moved in the counter-clockwise direction in the plane of the drawing in FIG. 5 and runs around reversing rollers 113, 114, 115 and 116 of which the rollers 113 and 114 are motor driven. These drive motors are not illustrated in the drawings. With the transport device a signal emitter 117 is moved which is arranged to act upon a make switch 118 which switches on the motor 119 on energization by the signal emitter 117. The motor 119 drives a shaft 120 which in turn through correspondingly arranged bevel gears 121 drives a transverse shaft 122 so that all raising and lowering devices 123, 124 and 125 according to the invention are operatively connected with a drive (motor 119). A safety switch 126 is connected with the motor 119 and frees the latter as soon as a proving tray comes out of contact with it. On the shaft 120 a signal emitter 127 is arranged which at an appropriate moment actuates the break switch 128 which likewise is electrically connected with the motor 119.

Figure 6:
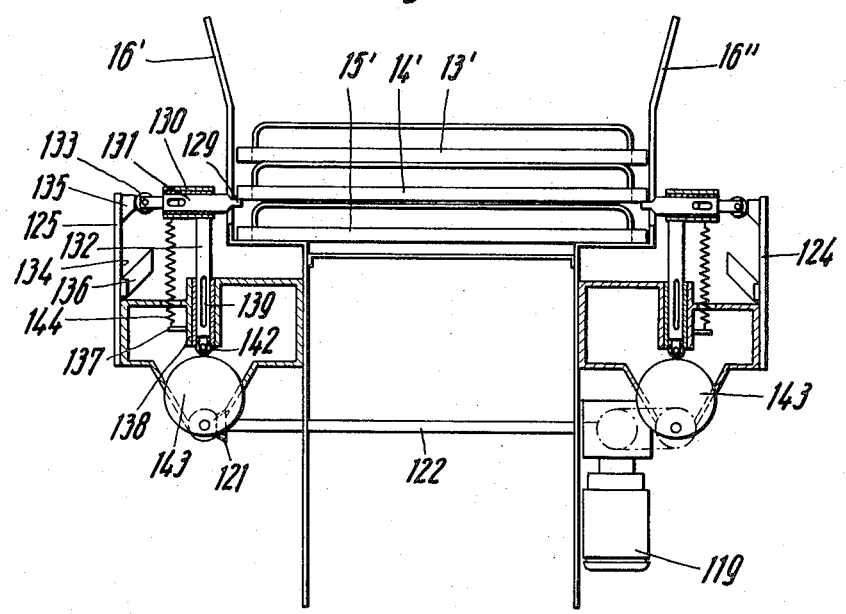
FIG. 6 shows a cross-section through the raising and lowering device according to the example of embodiment as represented in FIG. 5.

FIG. 6 shows a cross-section through the magazine in the form of embodiment as illustrated in FIG. 5, the raising and lowering devices 124 and 125 being represented in clarified manner. 129 designates a support surface which is integrally connected with a cylinder 131 arranged for horizontal sliding in a sleeve 130 and secured against rotation. The sleeve 130 is in turn secured with a bolt 132, for example by welding. On the axially opposite end of the cylinder 131 a roller 133 is rotatably mounted which in the upper position of the cylinder 131 as reproduced in FIG. 6 strikes against an upper ramp or cam surface 135 arranged on the inside of the housing 134 of the raising and lowering device 125 (or 123 and 124). Thus the support surface 129 is brought into a holding position and held fast there. At this point it should be remarked that the raising and lowering devices as illustrated in the example of embodiment are similarly formed, so that only the raising and lowering device reproduced on the left side of FIG. 6 is provided with reference numerals. Beneath the upper ramp surface 135 there is a lower ramp surface 136 which is likewise secured on the end side of the housing wall 134, for example by welding, riveting or the like. Between the sleeve 130 and a housing part 137 there is a tension spring 144. The bolt 132 is mounted for sliding in a guide 138, which can be made for example in the form of a bush, and secured against rotation perpendicularly of its axial direction. The rotation prevention can be made in the form of a cam arranged within the guide and running in a slot 139 of the bolt 132. However rotation prevention is possible in which, conversely, a cam is arranged on the bolt 132 and runs in a slot which is situated within the guide formed as bush. The cylinder 131 is secured against rotation in a similar way in the sleeve 130, as indicated by the longitudinal slot 140 in the sleeve 130 and by a pin 141 firmly connected with the cylinder 131 (see FIG. 7 in this connection). At the lower end of the bolt 132 (see FIG. 6) a follower roller 142 is rotatably mounted which rolls on the peripheral edge face of an eccentric disc 143. The eccentric disc 143 is set in rotation by the transverse shaft 122, driven by the motor 119, through a bevel gear 121 on operation of the motor 119.

The form of embodiment of the drive for the bolt 132 for carrying out an upward and downward movement as illustrated in FIG. 6 is here merely indicated as an example of embodiment. In an example of embodiment which is not illustrated, in place of the eccentric disc 143 a centrally arranged disc can be used on which there is a groove milled eccentrically on the lateral surface, in which a guide element of the bolt 132 runs.

Figure 7:
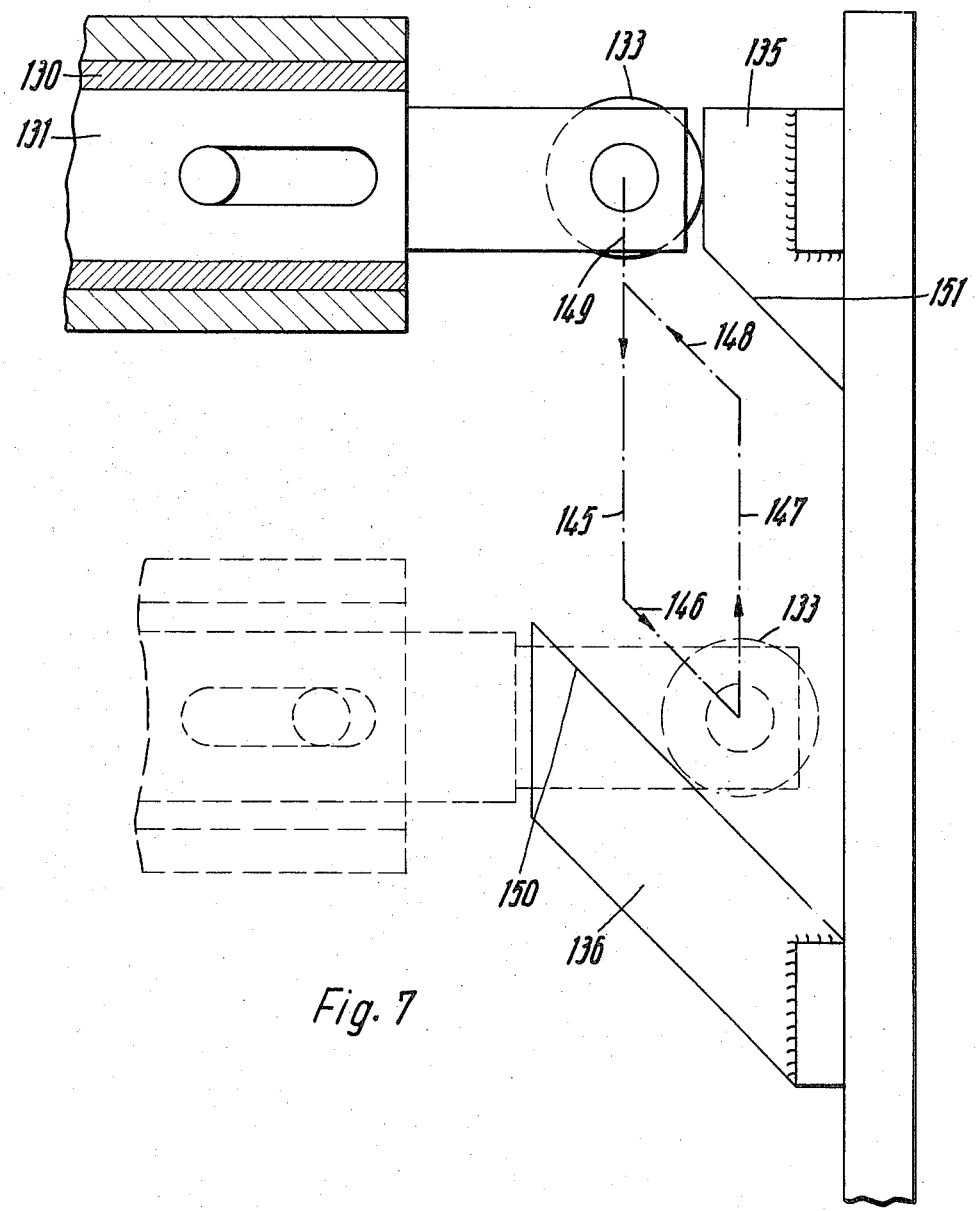
FIG. 7 shows an enlarged cross-section of the most important kinematic and guide elements of the raising and lowering device according to the invention in diagrammatic representation.

Now the operation of the raising and lowering device for a magazine for the stacking of similar elements according to the form of embodiment as represented in FIG. 5, 6 and 7 proceeds as follows. Any desired number of proving trays 12', 13', 14' and 15' for example are stacked into the magazine 11' one above the other, for example by hand or by an automatic feed device. In the case of use of proving trays of a combined dough divider and hander-up with transport and filling devices, it is expedient for as many proving trays to be filled into the magazine as are necessary for the charging of a baking hearth for the carrying out of one baking charge. By closure of a main switch (not shown) for the transport apparatus a drive motor acts upon the gear wheel 113 or 114 and sets the chain 111 in motion in the counter-clockwise direction (in FIG. 5). Thus an engaging member 112 on the endless chain 111 reaches the lowermost proving tray 15' and transports in either continusouly or with a specific fixed feed motion step by step in the direction of the conveyor belt 19' of a filling station. In synchronism with this feed motion dough pieces 110 are fed by the conveyor belt 19' to the proving tray now situated beneath the conveyor belt 19'. While the lowermost proving tray 15' is transported by the transport device and the endless chain 111 to the filling station and to the conveyor belt 19', the next following proving tray 14' rests at a certain distance above the proving tray 15' and upon the support surfaces 129 of the cylinder 131. The height of the support surfaces 129 is here set so that the lowermost proving tray 15' can be transported into the filling station without hindrance by the next following proving tray 14′ lying thereabove. When the lowermost proving tray 15′ or 18′ has released the safety switch 126 the motor 119 can be started up for the drive of the raising and lowering devices 123, 124 and 125. The energization of the motor 119 takes place through an on switch 118 which is actuated by the signal emitter 117 at the chronologically correct moment, which emitter is set in rotation synchronously by the transport device or the reversing roller 113 or 114. Starting up of the motor 119 effects a rotation of the shafts 120 and 122, so that all four eccentric discs 143 of the raising and lowering devices are set in rotation in the same direction synchronously through the bevel gears 121.

The further function will be described hereinafter by reference to only one raising and lowering device and it should be remarked that the same or corresponding actions proceed synchronously for the other raising and lower devices which are situated within the magazine. By the loading of the support surfaces 129 by the proving trays 14′ and 13′ situated thereon and by the tension of the spring 144 it is ensured that the roller 142 of the bolt 132 always remains on the periphery of the eccentric disc 143. Now by rotation of the eccentric disc 143 the bolt 132 and thus the support surface 129 and the cylinder 131 are moved downwards from their highest position shown in solid lines in FIG. 7. At the moment when the proving tray moved downwards with the support surface 129 rests on the chain 111 of the transport device the roller 133 reaches the upper part of the lower ramp or cam surface 136 (see FIG. 7) which has the effect that the roller 133 rolls along the upper edge of the ramp or cam surface 136 and thus guides the cylinder 131 and the support surface 129 to the side. In the example described here of the raising and lowering device 125 arranged on the left side of FIG. 6, a lateral movement takes place to the left. The course of movement of the support surface 129 is so directed that the lateral displacement of the support surface 129 takes place only when the lowermost proving tray 15′ already rests on the endless chain 111 of the transport device. Thus the object is achieved that the support surface 129 detaches itself in friction-free manner from the proving tray 15′. Since the support surface 129 is now not loaded by the proving trays, the spring 144 intervenes here and by means of the roller 133, which is moved further on the lower ramp surface, has the effect that the support surface 129 is completely removed from the region of the proving trays. When this point is reached the bolt 132 is moved upwards again by the continuous further rotation of the eccentric disc 143, until the roller 133 strikes against the upper ramp or cam surface 151. Since the bolt 132 and thus also the cylinder 131 are moved further upwards, the cylinder 131 by means of the oblique face 151 of the upper ramp surface 135 shifts to the right until the support surface 129 has reached the underside of the next succeeding proving tray 14′. At this moment the lateral displacement of the cylinder 131 is terminated, but a slight further lift is still effected by the bolt 132, so that the proving tray 14′ and thus the further proving trays situated above it are lifted until the proving tray 15′ can be removed, without contact with the proving tray 14′ out of the magazine. It is seen from FIG. 7 that the spaced cam faces 150 and 151 extend downwardly and away from the vertical travelling path of the cylinder 131 and that the vertical plane which contains the vertical surface of the cam 135 intersects the cam face 150 spaced downward from the cam face 151.

To clarify this operation in FIG. 7 the movement curve is reproduced which is travelled by the support surface 129 and the cylinder 131 or the spindle 144 of the roller 133. The movement curve is made in parallelogram form and comprises the path parts 145, 146, 147 and 148, adjoined by a section 149. This extension 149 is of such size that an unhindered conducting out is guaranteed of the proving tray resting on the transport device or the endless chain 111 (in this case the proving tray 15′).

In FIG. 7 the upper position of the roller 133 and of the cylinder 131 in its sleeve 130 is illustrated in solid lines while the lower position of these elements is indicated by chain lines. As becomes clear from this Figure the roller 133 on reaching the lower ramp surface 136 carries out a course which is designated by the curve part 146. The lower ramp surface 136 however pushes into a slot (not illustrated) beneath the cylinder 131. The vertically extending track parts 149, 145 and 147 and the vertical components of the track parts 146 and 148 are effected by rotation of the eccentric discs 143, while the horizontal components of the track parts 146 and 148 are generated by the oblique faces 150 of the lower ramp surface and 151 of the upper ramp surface 135.

The basic principles of the magazine and the raising and lowering devices according to the invention can also be used to fill a magazine with full proving trays. As may readily be seen in this case it is necessary that the time course should proceed in the reverse sequence.

The individual raising and lowering devices are now so formed that they can be installed in a relatively simple manner in already existing magazines The invention renders it possible for a combined dough divider and hander-up with transport and filling devices to work continuously irrespective of whether an operator feeds an empty proving tray to the magazine. Thus the magazine can be filled from the outside with a sufficient number of proving trays, approximately as many as are needed to fill a baking hearth, so that thereafter the installation can work continuously until all the proving trays are filled with dough pieces.

Thus the object is achieved that the entire installation is advantageously independent of the working rhythm of an operator. Due to a continuous manner of working of the entire installation this is exploited to the maximum and furthermore a constant quality of the dough pieces is achieved. Since the dough pieces are goods which have to prove, there is in fact the danger that on shutting off of the entire installation and thus interruption of the continuous working process the quality of the dough pieces may suffer, since a proving process is continued in this time.

The magazine according to the invention largely avoids an interruption of the production process. The raising and lowering device can here be formed as a compact unit which can also be used for magazines of other kinds. In general the invention can be used for magazines in which similar stackable goods are arranged one above the other or are to be so arranged.

It will be understood that the above description of the present invention is susceptible to various modifications, changes and adaptations.

What is claimed is:

1. A magazine for stackable trays having a storage means for receiving the trays in a vertically stacked condition; stack support means for engaging the lowermost tray of the stack and for vertically moving the latter; means for moving said stack support means in a vertical direction; means for moving said stack support means out of and into the vertical path of travel of the tray stack, whereby in one cycle of operation in succession the tray stack is lowered by the stack support means engaging the lowermost tray, the lowermost tray is released and the next to the lowermost tray is engaged by the stack support means and the tray stack is raised for separating the lowermost tray from the tray stack; and removing means for moving the lowermost tray away from below the tray stack subsequent to its separation from the tray stack; the improvement comprising in combination:
   a. a first member arranged solely for vertical linear reciprocation, said first member having a first or highest position, successively lower second and third positions and a fourth or lowest position;
   b. a guide means affixed to said first member for movement therewith as a unit;
   c. a second member arranged solely for horizontal linear reciprocation and supported by said guide means, said second member having a support surface for engagement with the lowermost tray of said stack for supporting the latter, said first and second members and said guide means forming said stack support means;
   d. drive means coupled to said first member for moving the same, said drive means forming said means for moving said stack support means in a vertical direction;
   e. a follower roller connected to said second member; and
   f. cam means engaged by said follower roller for linearly moving said second member into a first position and a second position, in said first position of said second member the said support face thereof is disposed below the lowermost tray of said stack in the travelling path thereof, in said second position of said second member the said support face thereof is laterally withdrawn from said travelling path, said cam means having
      1. a first stationary cam face so arranged that it locks said second member in its said first position when said first member is in said highest position, whereby said tray stack is supported by said support surface of said second member vertically above and out of engagement with a tray supported on said removing means, said first stationary cam face lying in a vertical plane and extending below the height of said first position of said first member;
      2. a second stationary cam face so arranged that it moves said second member from its said first position to its said second position as said first member moves downward from its said third position to its said fourth position, said second stationary cam face extending from the height of said third position of said first member in a direction downward and away from the travelling path of said first member at least until the height of said fourth position of said first member, said second stationary cam face being intersected at the approximate height of said third position of said first member by the vertical plane containing said first stationary cam face;
      3. a third stationary cam face so arranged that it moves said second member from its said second position to its said first position as said first member moves upward from its said second position to its said first position, said third stationary cam face adjoining said first stationary cam face and extending in a direction downward and away from the travelling path of said first member at least until the height of the second position of said first member;
   whereby any selected point on said second member describes a closed path enclosing an area lying in a vertical plane, as said first member moves from its said first position to its said fourth position and back into its said first position during one cycle of operation.

2. A magazine as defined in claim 1, wherein said drive means coupled to said first member includes a driven disc having an eccentric edge face; a follower affixed to said first member and in engagement with said eccentric edge face, whereby the vertical reciprocating motion of said first member is effected by the cooperation between said driven disc and said follower.

3. A magazine as defined in claim 2, further comprising means connecting said disc operatively to said removing means, a switch controlled by said cam and a motor for driving said stack support means and actuated by said switch.

4. A magazine as defined in claim 3, further comprising a safety switch operable by a tray when in a position ready to be moved by said removing means for switching off said motor.

5. A magazine as defined in claim 1, wherein said removing means comprises a transport device to which said trays are fed by said stack support means.

6. A magazine as defined in claim 1, wherein said closed path comprises a parallelogram path with an upward extension for raising the next to the lowermost tray out of contact with the lowermost tray.

7. A magazine as defined in claim 2, wherein said first member is a vertically extending bolt; the improvement further comprising an additional guide means for and in engagement with said bolt and means for preventing rotation of said bolt about its axis.

8. A magazine as defined in claim 2, wherein said follower is a roller secured to said first member and in engagement with said eccentric edge face of said driven disc.

9. A magazine as defined in claim 2, wherein said drive means connected to said first member further includes a motor coupled to said driven disc for driving the same; the improvement further comprising an actuating switch means connected to said drive means for causing said motor to rotate said driven disc in synchronism with said removing means.

10. A magazine as defined in claim 9, wherein said drive means connected to said first member further comprises a shaft driving said disc from said motor and a switch off element associated with said shaft for switching off said motor when said first member is in said relatively high position.

11. A magazine as defined in claim 2, including spring means for urging the follower of said first member into continuous contact with said driven disc.

* * * * *